United States Patent [19]

Fischer et al.

[11] 4,058,176
[45] Nov. 15, 1977

[54] TOOL AND METHOD FOR DRILLING A HOLE WITH AN INCREASED CROSS-SECTIONAL AREA

[75] Inventors: Artur Fischer; Klaus Fischer, both of Tumlingen, Gde. Waldachtal, Germany

[73] Assignee: Artur Fischer, Tumlingen, Gde. Waldachtal, Germany

[21] Appl. No.: 638,413

[22] Filed: Dec. 5, 1975

[30] Foreign Application Priority Data

Dec. 11, 1974 Germany ............................ 2458615
Mar. 8, 1975 Germany ............................ 2510134

[51] Int. Cl.² ............................................. E21C 15/00
[52] U.S. Cl. ................................. 175/61; 64/2 R; 173/131; 175/320
[58] Field of Search ................. 64/2 R, 15 C; 175/61, 175/320; 173/131

[56] References Cited

U.S. PATENT DOCUMENTS

| 919,808 | 4/1909 | Bales | 175/320 |
|---|---|---|---|
| 1,485,036 | 2/1924 | Kingsley | 64/15 C |
| 2,388,741 | 11/1945 | Hays | 175/320 |
| 2,441,881 | 5/1948 | Hays | 175/320 |
| 2,765,149 | 10/1956 | Christodolu | 64/2 R |
| 3,118,159 | 1/1964 | Kollmann | 64/2 R |
| 3,934,428 | 1/1976 | Hedin | 64/2 P |

FOREIGN PATENT DOCUMENTS

989,431 9/1951 France ............................ 175/320

*Primary Examiner*—Ernest R. Purser
*Attorney, Agent, or Firm*—Michael J. Striker

[57] ABSTRACT

A tool and a method for drilling holes having an increased cross-sectional area in a region remote from an exposed surface of the support structure in which the holes are to be drilled include mounting a drill bit having cutting edges at one end of a resiliently-deflectable, elongated force-transmitting spring, and angularly displacing an other end of the elongated force-transmitting spring so as to resiliently deflect said one end thereof into a plurality of positions in each of which the cutting edges of the drill bit are brought into engagement with the inner circumferential wall of the hole being drilled so as to form undercut surfaces in said region.

16 Claims, 1 Drawing Figure

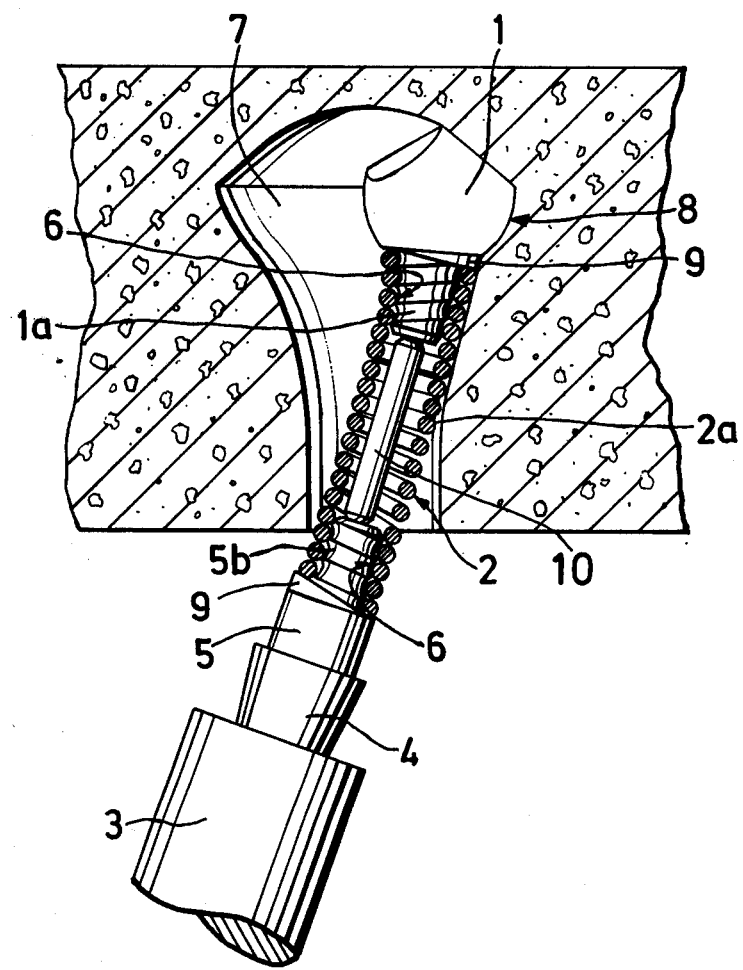

TOOL AND METHOD FOR DRILLING A HOLE WITH AN INCREASED CROSS-SECTIONAL AREA

BACKGROUND OF THE INVENTION

The present invention relates generally to the drilling of a hole in a support structure and, more particularly, to a tool and method for forming a hole having an increased cross-sectional area in a region remote from an exposed surface of the support structure so as to form undercut surfaces which facilitate the anchoring of a fastening element therein.

Various fastening elements are already known for the purpose of anchoring an object to a support structure. One type of fastening elements has spreading portions which include an expansion sleeve of generally cylindrical configuration prior to the insertion and anchoring of the fastening element in a cylindrical hole of a support structure, and a screw accommodated in the sleeve. When the screw is tightened, the spreading portions of the sleeve spread apart and anchor the sleeve, thus anchoring the fastening element in the supporting structure.

The spreading of the spreading portions may be achieved either by the screw itself, or by an expander element mounted on the screw which is drawn between the spreading portions and which pushes them apart during the tightening of the screw.

Such arrangements generally achieve satisfactory results provided that the material of the support structure is such as to permit at least partial yielding of the walls surrounding the end of the cylindrical hole in the region in which the spreading portions of the sleeve are accommodated. In this event, the spreading portions of the sleeve deform the walls in this region, thus forming a V-shaped or a conically-enlarged portion in the cylindrical hole so that the spreading portions engage behind the material of the support structure. It will be understood that the anchoring action of the fastening element is proportional to the degree to which the spreading portions of the sleeve are spread apart for any given material of a support structure. Aside from the force available for tightening the screw, the ridigity of the material used for the spreading portions is the most determinative factor which determines the degree of spreading of the spreading portions.

However, experience has shown that when the conventional fastening elements are anchored in cylindrical holes which are provided in masonry walls or concrete structures or the like, the anchoring effect is rather unsatisfactory due to the fact that even when steel is used for the fastening element, the spreading of the spreading portions of the sleeve is limited by the inner circumferential wall of the cylindrical hole itself since the material of the support structure will yield only slightly with disproportionately increasing force being needed for tightening the screw of the fastening element and spreading apart the spreading portions thereof. Furthermore, even if an unlimited tightening force were available, the spreading portions of the sleeves themselves become deformed rather than the highly rigid walls surrounding the hole.

Hence, it has been proposed to form the cylindrical holes with an increased cross-sectional area in its bottom region prior to insertion of the fastening element into the hole. This increased area provides undercut abutment surfaces which diverge in direction away from the exposed surface of the support structure and which are engaged by the spreading portions of the fastening element. However, the presently known tools utilize rigid drill shafts upon which are mounted spherical collars. The collar may have a larger diameter than the hole being drilled in which case the collar rests against the access edge of the hole; alternatively, the collar may have a smaller diameter than the hole being drilled in which case the collar is accommodated in the interior of the hole. In this event, the rigid drill shaft is tilted because of the spherical outer contour of the collar to produce the undercut surfaces.

However, this prior-art technique has not proven altogether satisfactory since the rigid drill shaft has a tendency to break as it is rocked in the hole. The lever-type action causes the drill shaft to be especially subject to breakage when it is desired to produce undercut surfaces which extend greatly into the interior of the support surface in the radial direction.

There are also already known various fastening elements which are anchored in a support structure by injecting a hardenable substance, such as cement, into the interior of the cylindrical hole exteriorly of the fastening element so as to form plug thereabout. The anchoring values for such known fastening elements primarily depend upon the composition of the hardenable substance itself.

SUMMARY OF THE INVENTION

Accordingly, it is an object of the present invention to avoid the disadvantages of the prior art methods of anchoring fastening elements in support structures.

It is a further object of the present invention to provide a method of drilling holes having an increased cross-sectional area in a region remote from an exposed surface of a support structure which is suitable for accommodation and anchoring of conventional fastening elements therein that are devoid of the disadvantages attendant to the prior art methods.

It is still another object of the present invention to increase the anchoring action of a conventional fastening element in a hole provided in a support structure with attendant reduction of the force needed for spreading the spreading portions of a sleeve of a fastening element.

It is a further object of the present invention to provide a tool for drilling a hole in a relatively rigid structure for accommodating and anchoring a fastening element therein.

An additional object of the present invention is to form undercut surfaces of a hole in a support structure without breaking the drill shaft of the tool.

In keeping with these objects and others which will become apparent hereinafter, one of the features of the invention resides, briefly stated, in a tool and a method for drilling holes having an increased cross-sectional area in a region remote from an exposed surface of a support structure in which the holes are to be drilled including the steps of mounting a drill bit having cutting edges at one end of a resiliently-deflectable, elongated force-transmitting means or spring, and angularly displacing another end of the elongated force-transmitting means so as to resiliently displace said one end thereof into a plurality of positions in each of which the cutting edges of the drill bit are brought into engagement with the inner circumferential wall of the hole being drilled so as to form undercut surfaces in said region.

The hole which is so produced according to the method of this invention and which is made by the tool of the invention has an increased cross-sectional area in a region of the hole which is remote from the exposed surface of the support structure so that, if a spreadable-type fastening element were inserted into the hole and the screw thereof were tightened, the spreading portions of the sleeve of the fastening element would be free to expand without meeting any substantial resistance until they abut against the undercut abutment surfaces of the enlarged portion of the hole so that they are eventually pressed against the same. It may be seen that high tightening pressures are eliminated which not only prevents an operator from marring the inner circumferential wall of the hole, but also prevents the danger of actually causing the support structure to crumble when especially high tightening pressures are utilized. Even if the pressures exerted by the spreading members on the abutment surfaces are relatively low, the degree of the anchoring action is substantially so that the resistance of the fastening element of extraction from the hole is very high so that substantial loads may be connected to the fastening element and thereby anchored to the support structure. Furthermore, due to the fact that the enlarged portion of the hole diverges in direction away from the exposed surface of the support structure, a much better pressure distribution over the surfaces of the spreading portions which engage the abutment surfaces of the hole is achieved over the prior-art constructions.

If a cemented-in type fastening element were inserted into a hole produced according to the method of the invention, the anchorage values would be similarly increased since the degree of anchoring action no longer depends primarily on the composition of the hardenable substance itself, but now is also dependent on the V-shape or conically-shaped configuration of the plug.

As noted above, in order to produce the hole, the force-transmitting means or spring or drill shaft is not rigid but is resiliently deflectable. This substantially eliminates breakage of the drill shaft since it is now possible to incline the same, either in a rocking and/or circular motion, while the drill bit itself is being driven, either in a reciprocatory and/or rotary motion. The kind of movement or inclination performed during the drilling of the hole well, of course, depend on the configuration of the fastening element to be secured therein, and especially on the number and orientation of the spreading portions of the sleeve.

According to another feature of the invention, the drill shaft is comprised of a hollow block spring comprised of a plurality of coils of springy wire. The spring serves not only to transmit the force of a force-imparting unit without substantial losses, but also permits the cuttings of the drilling operation to escape through its hollow interior in a manner similar to the spiral channels provided on spiral-type drill bits.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a partially broken-away side view in partial vertical section of a preferred embodiment according to the present invention

DESCRIPTION OF THE PREFERRED EMBODIMENTS

Referring to the single FIGURE, it may be seen that the tool 2 includes a drill bit 1 which is shaped in the form of a drill leaf. The drill bit 1 may be made of hardened metal, such as alloyed steel or the like, and has front cutting edges and lateral cutting edges 8.

The tool 2 further includes resiliently deflectable, elongated force-transmitting means or a spring 2a which serves as the drill shaft. One end of the spring 2a is connected to the drill bit 1; the other end is adapted to be connected to the force-imparting unit 3. The spring 2a is hollow and is preferably of the block-type which is comprised of a plurality of coils of springy or resiliently deflectable wire.

The force-imparting unit 3 may be any unit capable of generating a force having axial and/or radial components. Thus, impact hammers and other like drilling machines which are conventional in the art may be utilized to impart force to the spring 2a which, in turn, transmits at least a portion of this force to the drill bit 1 so as to drill a hole, such as the one identified by reference numeral 7, in both rigid and porous support structures, such as masonry, stone, concrete structures and the like.

At the first-mentioned or leading end of the spring 2a, as considered with reference to the direction of insertion of the drill bit 1 into the hole 7 being drilled, the drill bit 1 has a first free end cylindrical portion 1a which is received into the interior of the leading end of the spring 2a. The first free end portion may be frictionally wedged therein, or preferably a groove, such as a spirally arranged groove 6, is provided about its exterior circumferential surface so that the first free end portion 1a can be threadedly connected with the coils provided at the leading end of the spring 2a.

At the trailing end of the spring 2a, a cylindrical attachment member 5 is similarly provided with a second free end cylindrical portion 5b and a spirally arranged groove 6. Thus, both first and second free end portions 1a, 5b are affirmatively secured to the spring 2a and are prevented from turning with respect thereto. If a more secure connection is desired, the spring 2a can be soldered to the free-end portions. However, generally, this is not necessary if a right-hand coiled spring is used since during the drilling operation the free end portions tends to become more affirmatively threaded onto the spring.

The attachment member 5 also has an abutment portion which is adapted to be fixedly secured within the conically-shaped socket 4 of the force-imparting unit 3.

Each of the first and second free end portions 1a, 5b is respectively offset from the main body portion of the drill bit 1 and the abutment portion of the attachment member 5 and has a smaller diameter relative thereto so as to form shoulders at the juncture of the respective portions. At these shoulders, anti-tilting means 9 are provided intermediate the ends of the spring 2a and the abutment portions of the drill bit 1 and of the attachment member 5 so as to prevent the spring 2a from undesirably tilting with respect to the shoulders. It will be appreciated that a coiled spring has a generally helical configuration and, thus, has an inherent tendency to tilt about its own axis. To prevent this tilting, anti-tilting means are provided at the shoulders each of which comprises a skirt portion which frictionally surrounds at least the last coil of the respective end of the spring 2a, and a transverse portion having a rear planar surface which abuts against said shoulders. Thus, the ends of the spring 2a are substantially planar and present a uniform abutment surface at the shoulders which prevents the tilting of the spring 2a.

Having so described the tool 2, the operation thereof will now be briefly discussed. The force-imparting unit or drilling machine 3 is either set into rotary motion about its longitudinal axis, or set into reciprocatory motion in the direction of its longitudinal axis, or preferably both types of motion are simultaneously generated. The force is transmitted to the trailing end of the spring 2a by means of the second free end portion 5b of the attachment member 5. Thereupon the force is transmitted to the drill bit 1 through the various coils of the spring 2a. Then, by applying axial force to the tool 2 and directing the drill bit 1 towards an exposed surface of a support structure, a cylindrical hole of predetermined depth is formed and the front and lateral cutting edges 8 of the drill bit 1 contact and penetrate the structure.

Now, in accordance with the invention, the bottom region of the hole is to be enlarged. This is obtained by angularly displacing the trailing end of the spring 2a with respect to its leading end. This angular displacement may take the form of a rocking and/or circular motion. The drill shaft will not break when it contacts the inner circumferential wall of the hole being drillled, in contrast to the prior art, since it is not rigid, but, as noted above, resiliently-deflectable. This angular displacement may be performed in one plane only, in which case, a V-shaped enlarged portion is obtained and/or, in a circular motion, in which case, a generally conically-shaped enlarged portion is realized. In either or in both events, the hole 7 is formed with undercut surfaces.

In order to facilitate the formation of these undercut surfaces and for the further purpose of smoothing out these undecut surfaces so that they merge smoothly with the remainder of the hole, the lateral cutting edges 8 diverge axially and radially in direction away from the elongation of the spring 2a. The cutting edges 8 are preferably rounded and have an arc-like configuration.

In order to improve the transmission of force from the trailing end towards the leading end of the spring 2a, connecting means or an elongated rod 10 is interposed between the first and second free end portions 1a, 5b within the interior of the hollow spring 2a. The rod 10 has a diameter which is smaller than the inner diameter of the spring 2a so that the angular displacement of the spring 2a is not adversely affected. Of course, as the rod diameter decreases in size, the greater the number of positions in which the spring 2a is capable of assuming.

The connecting rod 10 may be constituted of hardened material, such as hardened steel. This feature prevents the rod 10 from buckling, even after long use. In addition, the conection of the rod 10 to the first and second free end portions is improved if the length of the rod 10 is made slightly longer than the distance at which the free end portions 1a, 5b are initially positioned relative to each other at opposite ends of the spring 2a. Thus, the slightly longer length of the rod 10 urges the free end portions 1a, 5b outwardly of each other and tends to establish a affirmative mechanical connection therebetween. Hence, in operation, the rod 10 and the spring 2a both cooperative to transmit the reciprocatory and/or rotary components of motion. Of course, the rod 10 serves to transmit the major part of the reciprocatory component, whereas the spring 2a serves to transmit the major part of the rotary component.

Having thus produced the hole according to the method of the present invention, either a spreadable-type or cemented-in type of fastening element may be anchored therein. The spreading portions of the spreadable-type fastening element encounters no resistance until they contact the undercut abutment surfaces. Thus, no yielding of the material of the support structure is necessary for safely anchoring the fastening element of the hole 7, but the degree of anchoring of the fastening element of the hole 7 is sufficiently high for withstanding even extremely high extraction forces.

It may be further seen that for cemented-in type fastening elements, the configuration of the hole also increases the anchoring effect since the plug itself now abuts against the undercut abutment surfaces.

It will be understood that each of the elements described above, or two or more together, may also find a useful application in other types of constructions differing from the types described above.

While the invention has been illustrated and described as embodied in a tool and method of drilling a hole with an increased cross-sectional area, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drill for drilling a hole into an exposed surface of a workpiece such that the hole has an increased cross-sectional area in a region remote from the exposed surface, comprising in combination, a force-imparting unit; bit means for drilling such a hole and comprising a plurality of cutting edges; force-transmitting means comprisign a resiliently deflectable elongated and hollow force-transmitting structure having two ends angularly displaceable relative to each other, one end being directly connected to said bit means and the other end being connected to said force-imparting unit, for varying the orientation of said bit means relative to the force-imparting unit and further including a rod of rigid material within said force-transmitting structure, said rod having a cross-section smaller than the inner cross-sectional of said force-transmitting structure and arranged to transmit longitudinal force from said force-imparting unit to said bit means.

2. The tool as defined in claim 1, wherein said force-transmitting means is a hollow block spring comprising a plurality of coils of resiliently deflectable wires.

3. A drill as defined in claim 2, wherein said rod is braced substantially exclusively by said block spring.

4. The tool as defined in claim 2, wherein said bit means has a first free end cylindrical portion which is received in said one end of said force-transmitting means; and further comprising an attachment member of said other end of said force-transmitting means, said attachment member having a second free end cylindrical portion which is received in said other end of said forece-transmitting means.

5. A drill as defined in claim 4, wherein said first and second free end cylindrical portions are respectively offset from the main body of said bit means and said attachment member.

6. The tool as defined in claim 4, wherein each of said cylindrical portions respectively has a spirally arranged groove about its circumference which is threadedly connected with the coils provided at said opposite ends of said block spring.

7. The tool as defined in claim 4, wherein said bit means and said attachment member each further comprise a cylindrical abutment portion, each of said free end cylindrical portions having a smaller diameter than said respective abutment portion so as to form shoulders which abut against said opposite ends of said block spring.

8. The tool as defined in claim 7, and further comprising anti-tilting means at said shoulders intermediate said opposite ends of said block spring and said respective cylindrical abutment portions.

9. The tool as defined in claim 8, wherein each of said anti-tilting means has a skirt portion surrounding at least the last coil provided at said opposite ends of said block spring and a planar transverse portion in abutment with said shoulders.

10. The tool as defined in claim 4, wherein said rod has a length which is slightly longer than the distance at which said free end portions are initially positioned relative to each other after the latter have been received in said block spring so that the slightly longer length of said rod will urge said free end portions outwardly of each other and thereby establish an affirmative mechanical connection therebetween.

11. The tool as defined in claim 1, wherein said bit means is leaf-shaped, and wherein said cutting edges of said drill bit diverge at least in part in direction axially and radially away from the elongation of said force-transmitting means.

12. The tool as defined in claim 11, wherein said cutting edges of said bit means are rounded.

13. A drill as defined in claim 1, wherein said bit means is substantially shankless, and wherein said bit means has a larger cross-section than said force-transmitting structure.

14. A drill as defined in claim 1, wherein said rod is hardened steel.

15. A method for drilling, in an exposed surface of a workpiece, holes having an increased cross-sectional area in a region remote from the exposed surface, comprising the steps of mounting a drill bit having cutting edges at one end of a resiliently deflectable, elongated and hollow force-transmitting structure; connecting the other end of said force-transmitting structure to a force-imparting unit; forming a stable connection between said force-imparting structure and said bit by inserting a rigid member having a smaller cross-section than the inner cross-section of said force-transmitting structure; and resiliently displacing said one end into a plurality of positions in each of which the cutting edges are brought into engagement with the inner circumferential wall of the hole being drilled by angularly displacing the other end of said force-transmitting structure relative to said one end to effect the forming of undercut surfaces in said region.

16. A drill for drilling an undercut hole in an expanded surface, comprising in combination, a drill bit having cutting edges; force-imparting means for imparting rotational and hammering forces; spring means connecting said drill bit and said force-imparting means for varying the orientation of said drill bit relative to said force-imparting means by bending in response to lateral movement of said force-imparting means and for transmitting rotational force from said force-imparting means to said drill bit; and an unbending rod means having a smaller cross-section than the inner cross-section of said spring means and connecting said force-imparting means and said drill bit and being positioned within said spring means exclusively by tension of said spring means for transmitting hammering force from said force-imparting means to said drill bit.

* * * * *